United States Patent [19]

Günthner

[11] Patent Number: 4,630,280
[45] Date of Patent: Dec. 16, 1986

[54] ELECTRODE ARRANGEMENT

[75] Inventor: Franz Günthner, Mainz-Lerchenberg, Fed. Rep. of Germany

[73] Assignee: Schott Glaswerke, Mainz, Fed. Rep. of Germany

[21] Appl. No.: 735,248

[22] Filed: May 17, 1985

[30] Foreign Application Priority Data

May 17, 1984 [DE] Fed. Rep. of Germany ....... 3418292

[51] Int. Cl.$^4$ ............................................. C03B 5/027
[52] U.S. Cl. ...................................... 373/41; 373/120
[58] Field of Search ................. 373/27, 29, 30, 36–41, 373/120, 128, 134; 65/DIG. 4

[56] References Cited

U.S. PATENT DOCUMENTS

| | | | |
|---|---|---|---|
| 2,531,612 | 11/1950 | Crochet et al. | 373/39 |
| 2,591,708 | 4/1952 | Lubatti | 373/41 |
| 3,506,769 | 4/1970 | Gell | 373/41 |
| 4,110,098 | 8/1978 | Mattmuller | 373/41 |

Primary Examiner—Roy N. Envall, Jr.
Attorney, Agent, or Firm—Millen & White

[57] ABSTRACT

In an electrode arrangement utilized for heating electric crucibles in glass melting processes, each electrode consists of several spaced electrode plates arranged in parallel and attached to connecting elements. The connecting elements of two neighboring electrodes are disposed in parallel to one another, and the electrode plates of each electrode are staggered with respect to those of the adjacent electrode by half the plate spacing. By using this arrangement, the electrode plates project into the space between the neighboring electrode plates. Consequently, a larger heat output per unit volume of glass melt is achieved without endangering the integrity of the refractory material of which the crucible is made.

12 Claims, 6 Drawing Figures

ELECTRODE ARRANGEMENT

BACKGROUND OF THE INVENTION (1) Field of the Invention

This invention relates to an electrode arrangement with plate-shaped electrodes, each of which is attached to a support, for heating electric crucibles used in glass melting processes.

(2) Technical Consideration and Prior Art

Direct and indirect heating methods are known for heating glass crucible furnaces. Indirect heating has found acceptance only with small crucibles and pot furnaces.

Direct heating is effected by means of electrodes dipping or extending into the glass melt. Direct heating relies on the ionic conducitivity of the glass melt, which conductivity depends greatly on the chemical composition of the glass, especially its alkali and alkaline earth content.

It is known from W. Trier, "Glasschmelzofen" [Glass Crucible Furnaces], Springer Publishers 1984 (pages 208-239) to utilize for heating purposes rod-shaped or plate-shaped electrodes in various designs and arrays. Customarily, two plate electrodes are mounted vertically on two facing walls of the crucible.

Of great importance in configuring the design of a direct heating furnace is a knowledge of the resistance of the heating path. In this connection, it must be taken into account that as current flows from one electrode to another, the flux path expands so that the current density can be very different at different locations between the electrodes. Consequently, determination of local current density distribution and of current resistance is a major problem.

Considered in the calculation for energy output is the resistance of the refractory material and the resistance of the glass melt. In case of external disturbances, a reduction in electric resistance of the refractory material can lead to excessive local power consumption in the crucible and thus to temperature increases and destruction of the refractory material. This phenomenon, known as thermal instability, can arise, for example, upon the following conditions: failure of electrode cooling, increases in current density, gradients of specific electrical resistance in the refractory material, and geometrical expansion of the region under consideration. Thermal instability in the refractory material is less dangerous than instability in glass melt since it can be prevented by increasing glass exchange between the electrodes. However, thermal instability in the refractory material does not permit to any appreciable extent an increase in melting efficiency per unit volume in existing or prior art electrode arrangements and constructions.

Furthermore, variations in structural arrangements are limited due to the amount of cooling power required for cooling the electrodes, which is in the range of 2-6 kW per electrode. Moreover, the dimensions of each electrode should be selected according to specific ratios.

SUMMARY OF THE INVENTION

In view of these considerations, it is an object of the present invention to provide electrode arrangements which have a greater heat output than conventional electrodes and conventional electrode arrangements.

Upon further study of the specification and appended claims, further objects and advantages of this invention will become apparent to those skilled in the art.

In view of this object and other objects the instant invention contemplates an electrode arrangement for glass crucible furnaces comprising a plurality of planar electrode plates arranged to form separate electrodes. Each electrode includes a connecting element with a plurality of electrode plates mounted thereon in spaced, parallel relationship with one another. The connecting elements also extend parallel to one another. The electrode plates on each connecting element are staggered with respect to the electrode plates on the adjacent connecting element and extend into the spaces between the electrode plates on the adjacent connecting element.

The instant invention further contemplates supporting the electrodes by supports which, in accordance with different embodiments of the invention, may be on the bottom of the furnace or depend from the rim of the glass tank forming the furnace.

The instant invention further contemplates spacers between the electrode plates and cooling nozzles for cooling portions of the electrode supports exterior to the glass melt.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein.

DESCRIPTION OF THE PREFERRED EMBODIMENTS

The following considerations form the basis for the electrode arrangement of this invention.

The total power of a heating circuit is $$P_T = P_G + P_R$$
$$P_{Total} = N_{Glass} + P_{Refractory}$$
$$= R_{Glass}I^2_{Glass} + R_{Refractory}I^2_{Refractory}$$
$$= V^2 \left( \frac{1}{R_{Glass}} + \frac{1}{R_{Refractory}} \right)$$

wherein $$R = \frac{SL}{F}$$

$\rho$ is the specific resistance, L is the length of the glass and of the refractory material respectively and F is the area of the glass and of the refractory material, respectively disposed perpendicular to the direction of L.

From the above considerations several phenomenon become apparent. The resistance of the glass path ($R_{Glass}$) decreases with decreases in the length of the glass path ($L_{Glass}$) and with increases in the area of the glass ($F_{Glass}$). The resistance of the refractory material ($R_{RefMat}$) increases with the length of the refractory material ($L_{RefMat}$) and with decreases in the area of the refractory material ($F_{RefMat}$). Consequently, the greater the proportion of total power introduced into the glass, the greater is the relief provided for the refractory material. Accordingly, the power per unit volume of melt can be much larger than is presently customary without endangering the refractory material, i.e. without the occurrence of thermal instability. Under given conditions, this is best accomplished by making the ratios of $L_{RefMat}/L_{Glass}$ and $F_{Glass}/F_{RefMat}$ as large as possible. The length ratio can be subjected to the greatest variation in maximizing the power per unit volume without causing thermal instability. A general understanding of glass melting phenomenon may be obtained from *Glass, Science and Technology*, D. R. Uhlmann et al, Academic Press, Inc. (1983) pp. 1–44.

Figure 1:
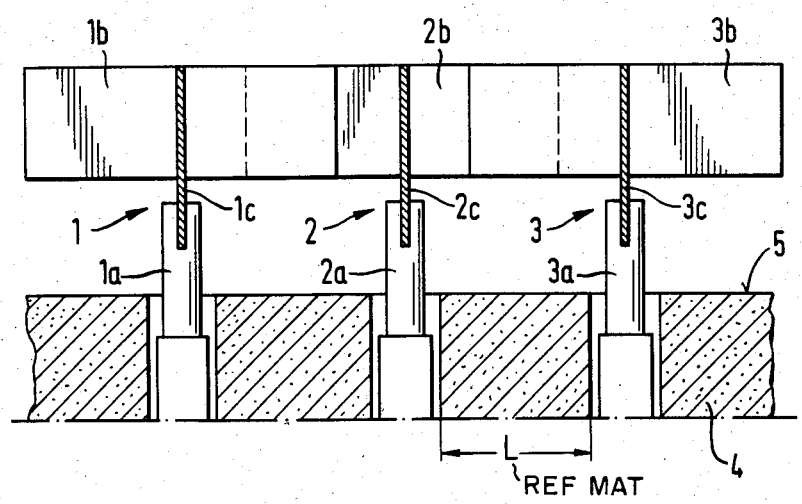
FIG. 1 shows a side view of the electrode arrangement of this invention.
Figure 3:
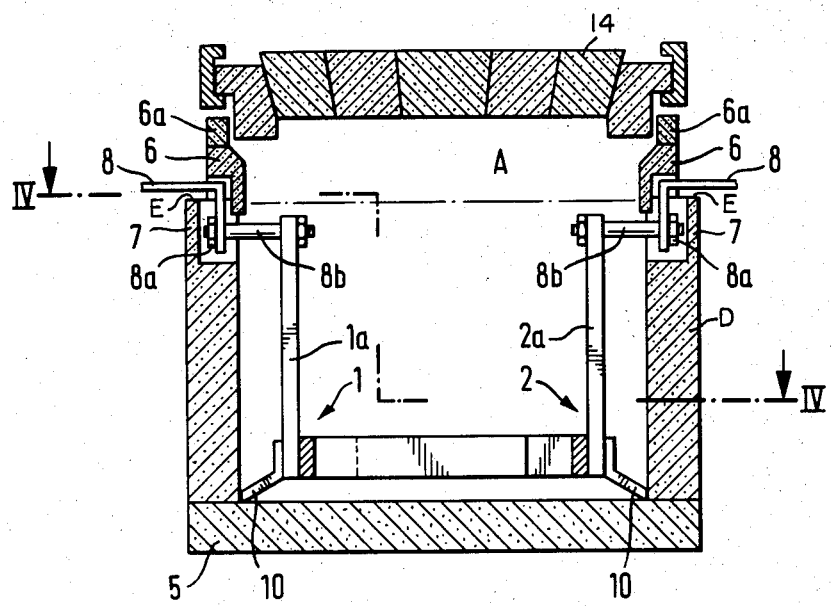
FIG. 3 is a vertical sectional view of a glass melting furnace with another embodiment of the electrode arrangement.
Figure 5:
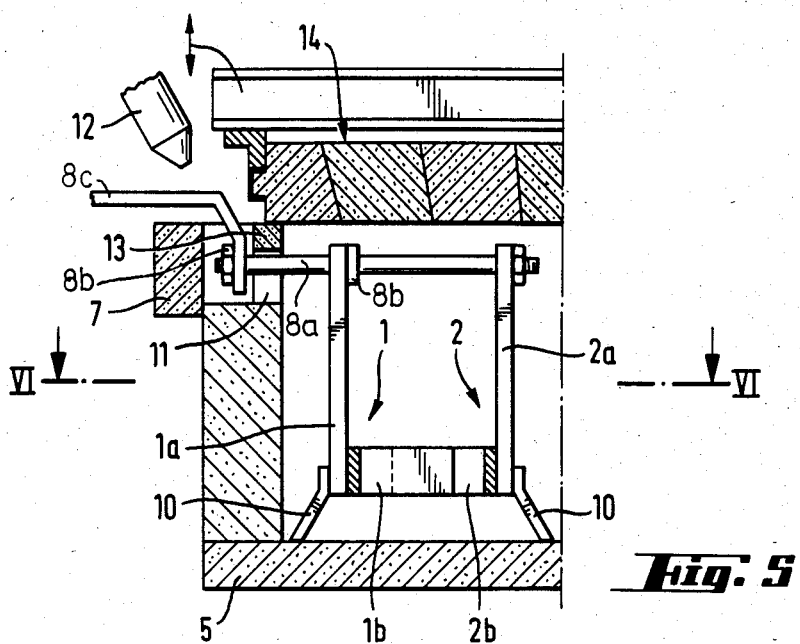
FIG. 5 is a vertical partial section through a glass furnace with still another embodiment of the electrode arrangement.

Referring now to the drawings, FIG. 1 is a front view of an array of electrodes 1, 2 and 3 which have supports 1a, 2a and 3a attached in refractory material 4 which material is disposed at the bottom 5 of a glass tank (see FIGS. 3 and 5). The electrodes 1, 2 and 3 have electrode plates 1b, 2b and 3b which each extend parallel with one another and normal to the supports 1a, 2a and 3a.

Figure 2:
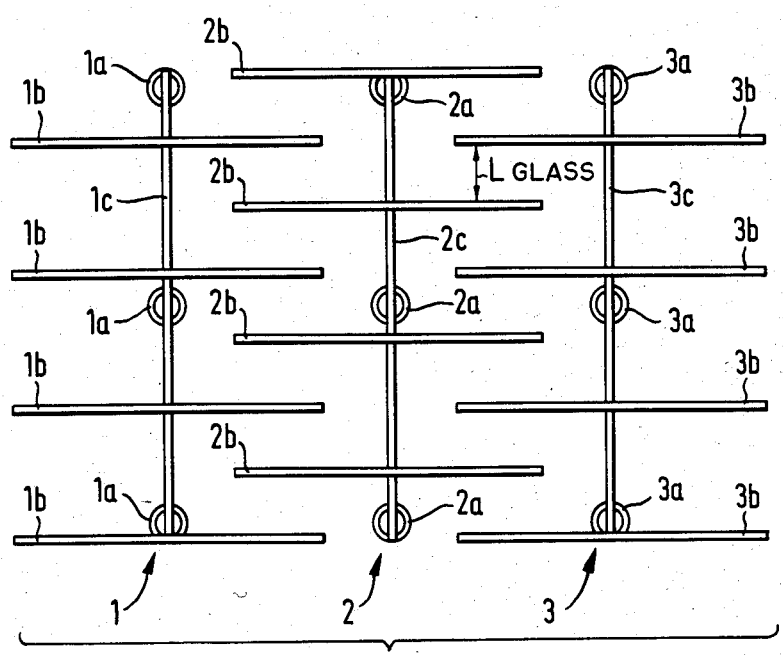
FIG. 2 is a top view of the electrode arrangement of FIG. 1.

FIG. 2 is a top view of the electrode arrangement. As seen in FIG. 2, each of the electrodes 1, 2 and 3 has four of the electrode plates 1b, 2b and 3b connected to one another and connected to the supports 1a, 2a and 3a by connecting elements 1c, 2c and 3c. The connecting elements 1c, 2c and 3c extend parallel with respect to one another and perpendicular to both the supports 1a, 2a and 3a and the plates 1b, 2b and 3b. The electrode plates 1b, 2b and 3b on each of the connecting elements 1c, 2c and 3c are positioned in spaced relation with one another while the supports 1a, 2a and 3a are respectively arranged in rows and are joined by the connecting elements 1c, 2c and 3c, respectively. The connecting elements of neighboring electrodes 1, 2 and 3 are disposed parallel to one another and are equally spaced apart.

The electrode plates 1b, 2b and 3b of one of the electrodes 1, 2 and 3 are offset with respect to the electrode plates of neighboring electrodes by half the spacing between the plates on one of the connecting elements 1c, 2c and 3c. Accordingly, the electrode plates on one connecting element project into the space between the electrode plates on the adjacent connecting element.

FIGS. 3-6 show glass furnaces, wherein the electrodes 1 and 2 and 1' and 2' are introduced into glass melting tanks D from the tops of the tanks over the tank rims E. This arrangement has the advantage that the electrodes can be exchanged while the tank is hot and filled with molten glass. For this purpose, bricks 6 and 6a of FIG. 3 are removed, or referring to FIG. 5, the cover 14 is lifted so that a brick 13 can be removed.

Figure 4:
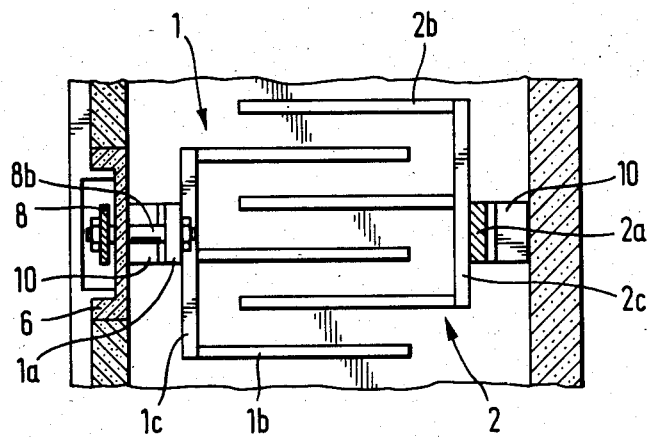
FIG. 4 is a section along line IV—IV in FIG. 3.
Figure 6:
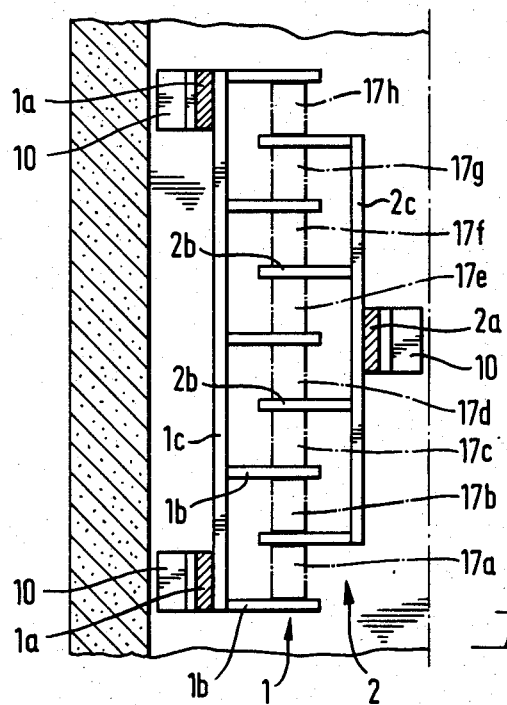
FIG. 6 is a section taken along line VI—VI of FIG. 5.

The electrode supports 1a and 2a can be located either on opposite sides of the tank D as is shown in FIGS. 3 and 4 or on the same side of the tank D as is shown in FIGS. 5 and 6. The electrodes 1 and 2 can be freely suspended in the glass melt within the tank D or they can be supported by molybdenum struts 10 projecting from the bottom 5 of the tank.

As is seen in the embodiment of FIG. 6, the electrode plates 1b and 2b are laterally supported by spacer members 17a through 17h, so that the distances between the electrode plates 1b and 2b are accurately maintained during installation. The spacer members 17 consist of a material such as sintered quartz glass which is resistant to temperature fluctuations and which does not interfere with the heating process when melted off in the glass. This is accomplished because the material of the spacer members 17 floats upwards upon being detached from the electrode plates 1b and 2b.

In the supports 1a and 2a of the embodiments of FIGS. 3-6 mounting screws 8a and connecting bolts 8b are made of molybdenum and are located below the molten glass level line A so as to be entirely engulfed by the glass flux. Each support has an outer flange 8c which is made of a heat-resistant and nonscaling material.

As is seen in the embodiment of FIG. 5, in order to render the glass flow and thus the glass heat exchange between inner and outer parts of the tank D minimal at area 11, air is supplied for cooling purposes by means of nozzles 12 (only one of which is shown).

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An electrode arrangement for glass crucible furnaces, the arrangement comprising:
   a plurality of planar electrode members arrayed to form separate electrodes, each having a plurality of plates;
   at least two connecting elements for mounting the electrode plates wherein each connecting element and the electrode plates mounted thereon form an electrode, the connecting elements extending parallel with respect to one another and in spaced relation to one another with the electrode plates projecting from the connecting elements and being mounted thereon in spaced relation with one another and with the electrode plates mounted on one connecting element being staggered with respect to the electrode plates mounted on an adjacent connecting element and projecting between the electrode plates on the adjacent connecting element, and
   means for supporting the connecting elements in a glass crucible furnace.

2. The arrangement according to claim 1 wherein the electrode plates of one electrode are offset by half the plate spacing with respect to the plates of the adjacent electrode.

3. The arrangement according to claim 1 wherein the support means are made of individual elements spaced from one another and arranged in a row.

4. The arrangement according to claim 1 wherein the connecting elements are planar, plate-like elements.

5. The arrangement according to claim 1 wherein the support means are positioned on the bottom of the glass-melting crucible furnace.

6. The arrangement according to claim 1 wherein the glass tank has a rim and wherein that the support means are located at the rim of the glass furnace and extend down into the glass melt within the furnace.

7. The arrangement according to claim 6 wherein the support means are located on opposite sides of the rim of the glass tank.

8. The arrangement according to claim 6 wherein the supports are located on the same side of the rim of the glass tank.

9. The arrangement according to claim 8 further including spacer members disposed between the electrode plates.

10. The arrangement of claim 1 further including spacer members disposed between the electrode plates.

11. The arrangement of claim 6 further including molybdenum members extending from the bottom of the glass tank to the electrodes for providing additional support for the electrodes.

12. The arrangement according to claim 6, further including air nozzle means disposed at the rim of the glass tank for cooling portions of the electrode support which are out of the glass melt within the tank.

* * * * *